United States Patent [19]

Fitch et al.

[11] 3,806,709

[45] Apr. 23, 1974

[54] SEQUENCE COUNTER CONTROL ARRANGEMENT

[75] Inventors: Harold G. Fitch, Clarendon Hills; Wing F. Mui, Chicago; Robert W. Wolff, Lombard, all of Ill.

[73] Assignee: GTE Automatic Electric Laboratories Incorporated, Northlake, Ill.

[22] Filed: Aug. 2, 1972

[21] Appl. No.: 277,424

[52] U.S. Cl. ........................ 235/92 EA, 235/92 CC
[51] Int. Cl. ........................................ H03k 21/30
[58] Field of Search....... 235/92 EA, 92 CT, 92 CC, 235/92 ST

[56] References Cited

UNITED STATES PATENTS

| | | | |
|---|---|---|---|
| 2,864,948 | 12/1958 | Neff | 235/92 EA |
| 2,816,226 | 12/1957 | Forrest et al | 235/92 R |
| 3,587,084 | 6/1971 | Schmidhauser | 235/92 EA |

*Primary Examiner*—Paul J. Henon
*Assistant Examiner*—Joseph M. Thesz, Jr.
*Attorney, Agent, or Firm*—B. E. Franz

[57] ABSTRACT

An arrangement for controlling the output information of a sequence counter includes a set of output logic gates responsive to the counter output information for generating sequencing information, a blanking circuit for inhibiting each one of the plurality of logic gates, and a control circuit responsive to counter-advancing signals for energizing the blanking circuit and for permitting the counter to generate the sequencing information after a first predetermined time interval following the energization of the blanking circuit, the control circuit de-energizing the blanking circuit after a second predetermined time interval following the first time interval to permit the gates to respond to a group of signals. Thus, the blanking circuit and the control circuit enable the counter to be advanced to a subsequent sequence state before the output logic gates generate the sequencing information so that the stages of the counter are switched to the next state during the second time interval and thus erroneous sequencing information is prevented from being generated during the transition period between sequence states.

9 Claims, 2 Drawing Figures

SEQUENCE COUNTER CONTROL ARRANGEMENT

BACKGROUND OF THE INVENTION

1. Field of the Invention

This invention relates to a sequence counter control arrangement, and it more particularly relates to an arrangement for controlling a sequence counter to prevent erroneous sequencing information from being generated during transitions from one counter sequence state to another such state.

2. Description of the Prior Art

Switching systems, such as telephone electronic switching systems, employ sequence counters for controlling various different system operations. For example, binary counters are advanced in accordance with system information, and decoding logic gates are employed to convert the binary coded state of the counter to sequencing information to control the sequence of operations of the system. However, such a sequencing arrangement has not been entirely satisfactory for some applications in that during a transition period from one counter sequence state to another state the stages of the counter to be set or reset do not always switch at the same time, whereby erroneous decoded sequencing information can be generated for a short period of time and thus system malfunctions may occur. In order to overcome this problem, binary counters have been arranged to provide output signals generated according to a certain code, known as a Gray code, whereby only one stage of the counter is changed at a time. However, for some applications, a Gray-code arrangement may not be possible where a different sequence is desired, or where the sequence is alterable. Also, it is not always desirable to use such a counter, since maintenance personnel cannot conveniently determine the sequence of operation of such a counter due to the uniqueness of the Gray code. Thus, in order to facilitate the maintenance of a sequence arrangement, it would be highly desirable to have a sequence counter control arrangement which permits the counter to be advanced according to a predictable sequence for the maintenance personnel without causing erroneous sequencing information to be generated.

SUMMARY OF THE INVENTION

An object of this invention is to provide a new and improved sequence counter control arrangement, which includes a sequence counter that changes state in a predictable manner for maintenance purposes, and which does not generate erroneous sequencing information during changes of state of the counter.

According to the invention, there is provided an arrangement which includes a plurality of output logic gates responsive to a series of sequentially-occurring groups of counting signals generated by the sequence counter, which in turn responds to counter advancing signals, a blanking circuit for inhibiting each one of the plurality of logic gates, and a control circuit responsive to the advancing signals for energizing the blanking circuit and for permitting the counter to generate the counting signals generated by the output logic gates after a first predetermined time interval following the energization of the blanking circuit, the control circuit de-energizing the blanking circuit after a second predetermined time interval following the first time interval to permit the gates to respond to a group of counting signals. As a result, during the time interval when the counter is changing its states, the output logic gates are inhibited until the end of the second timing interval so that the counter is provided with sufficient time to change its states completely before the output logic gates are energized, whereby erroneous sequencing signals are prevented from being generated.

CROSS-REFERENCES TO RELATED APPLICATIONS

The preferred embodiment of the present invention is incorporated in a MARKER FOR COMMUNICATION SWITCHING SYSTEM, U. S. Pat. No. 3,681,537 by J. W. Eddy, H. G. Fitch, W. F. Mui and A. M. Valente.

DESCRIPTION OF THE PREFERRED EMBODIMENT

Figure 1:
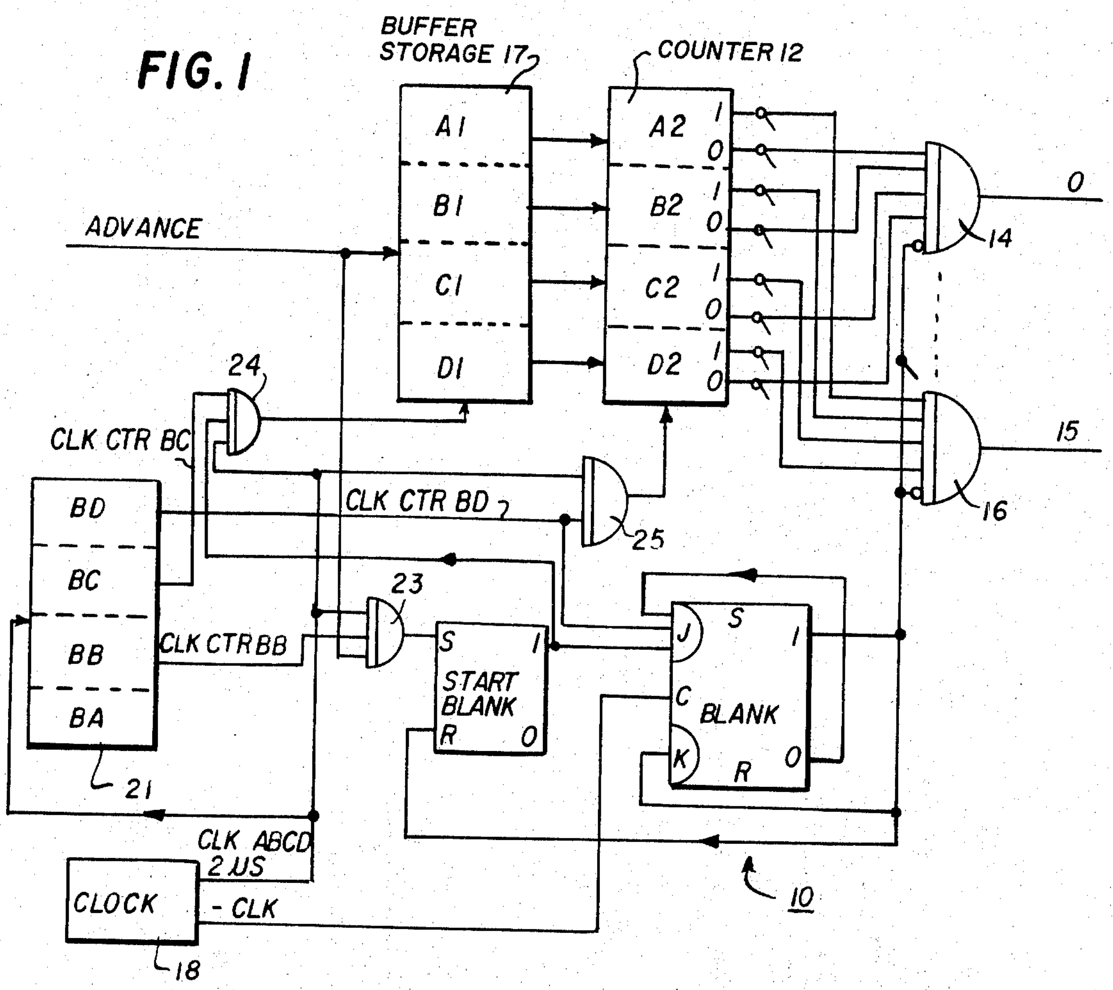
FIG. 1 is a functional block diagram of the sequence counter control arrangement of the present invention.

Referring now to the drawings, and more particularly to FIG. 1 thereof, there is shown a sequence counter control arrangement 10, which is constructed in accordance with the present invention. The arrangement 10 includes a sequence counter 12, which is a four-stage binary counter but could be any other type of sequencing device, a set of 16 coincidence AND gates, such as the first gate 14 and the last gate 16, for decoding the binary coded output signals of the counter 12 to decimal coded signals 0 through 15, which serve as sequencing signals to control the operation of a system (not shown). A buffer storage circuit 17, which is a binary counter similar to the counter 12 but may be any other type of sequencing device, stores input information temporarily as hereinafter described in greater detail and then transfers the information to the counter 12. A J-K flip-flop BLANK has its one output connected to the inhibit inputs to each one of the output AND gates for inhibiting them during changes of state of the counter 12 so that erroneous sequencing signals are not generated by the output AND gates as hereinafter described in greater detail. A latch circuit START BLANK enables the flip-flop BLANK during a negative transition of the square wave clock output signal —CLK of a clock source 18, and during the period of time when the signal CLK CTR BD of a four-stage clock counter 21 is present, the counter 21 having stages BA through BD. A coincidence AND gate 23 has its output connected to the set input of the latch START BLANK to set it in response to a signal ADVANCE for advancing the counter 12 and to a signal CLK CTR BB of the clock counter 21 is present, the counter 21 having stages BA through BD. A coincidence AND gate 23 has its output connected to the set input of the latch START BLANK to set it in response to a signal ADVANCE for advancing the counter 12 and to a signal CLK CTR BB of the clock counter 21 when a negative transition of a signal CLK ABCD 2$\mu$s from the clock 18 occurs. A coincidence AND gate 24 energized by a signal CLK CTR BC from the clock counter 21 during a negative transition of the signal CLK ABCD 2$\mu$s when the latch START BLANK is set, generates a clock signal to advance the buffer circuit 17. A coincidence AND gate 25 generates a clock signal for enabling the stages A through D of the counter 12, and is energized by the coincidence of the signal CLK CTR BD of the clock counter 21 and a negative transition of the signal CLK CTR BD of the clock counter 21 and a negative transition of the signal CLK ABCD 2μs from the clock 18 as hereinafter described in greater detail. In operation, when the signal ADVANCE becomes true, the clock counter 21 when in its state BB enables the gate 23, which in turn sets the latch START BLANK so that when the clock counter 21 advances to its stage BC, the signal CLK CTR BC enables the gate 24 to advance the buffer circuit 17 during a negative transition of the signal CLK ABCD 2μs at the end of the signal CLK CTR BC. Thereafter, when the clock counter 21 enters its last stage BD, the signal CLK CTR BD sets the flip-flop BLANK in response to the next negative transition of the signal —CLK of the clock 18. As a result, the flip-flop BLANK inhibits the AND gates, such as the AND gate 14, for blanking the sequencing signals 0 through 15. The gate 25 is enabled by the following negative transition of the clock signal CLK ABCD 2μs from the clock 18 to advance the counter 12 in accordance with the setting of the circuit 17. Thus, the output AND gates remain inhibited while the counter 12 is being advanced to prevent erroneous sequencing signals from being generated. When the next negative transition of the signal —CLK of the clock 18 occurs, the flip-flop BLANK is reset since its one output is connected back to its K input, whereby the inhibit inputs to the output gates are de-energized and thus the sequencing signals are then generated by the output gates indicating the new sequence state. It should be noted that since the counter 12 may be a conventional binary or any other type of sequencing device, maintenance personnel can readily predict its sequence of operation.

Figure 2:
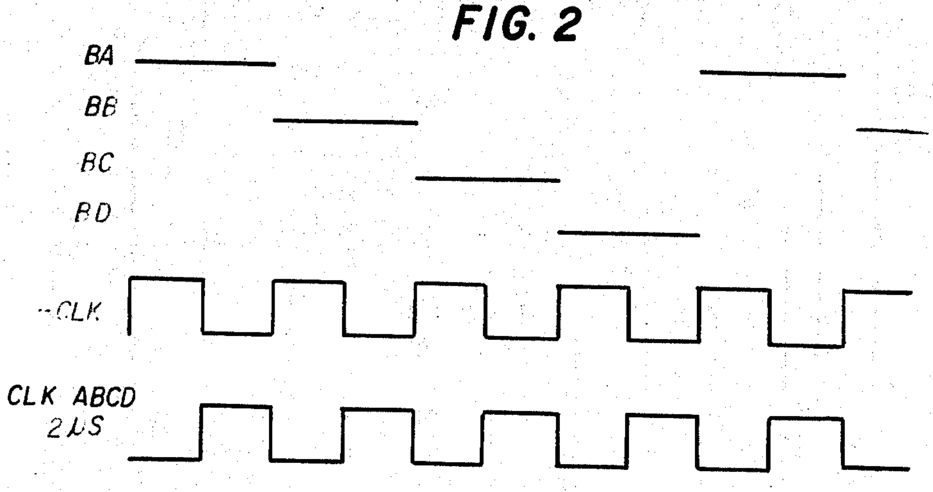
FIG. 2 is a timing diagram of the system of FIG. 1.

Considering now the timing diagram of FIG. 2, the clock counter 21 is a four-stage ring counter having stages BA, BB, BC, and BD. Each state of the clock counter 21 is energized for a period of two microseconds in the preferred embodiment of the present invention, and the stages are cyclically and sequentially interconnected as indicated by the output signals shown in FIG. 2 of the drawings. It should be understood that only the signals CLK CTR BB, CLK CTR BC and CLK CTR BD (indicated by the respective designations BB, BC and BD of the timing diagram of FIG. 2) are utilized directly. The clock counter 21 is advanced by the signal CLK ABCD 2μs, which is a square wave signal, having a negative transition every two microseconds for advancing the clock counter 21. The clock 18 also generates the signal —CLK, which is a square wave signal similar to the signal —CLK but 180° out of phase therewith.

Considering now the operation of the arrangement 10, assuming that the signal ADVANCE is present for the purpose of advancing the buffer circuit 17 to its next sequence state, the AND gate 23 is enabled when the signal CLK CTR BB is generated by the clock counter 21, the signal CLK CTR BB being generated, as indicated in the chart of FIG. 2, when the counter 21 is advanced from the state BA to the state BB by a negative transition of the signal CLK ABCD 2μs from the clock 18. When the gate 23 is enabled, it sets the latch START BLANK, which in turn primes the J input to the flip-flop BLANK. When the clock counter 21 advances from the state BB in response to the signal CLK ABCD 2μs to the state BC, the gate 24 is energized in response to the signal CLK CTR BC by the 1 output of the latch START BLANK and by a negative transition of the signal CLK ABCD 2μs at the end of the BC state of the clock counter 21 to advance the buffer circuit 17 in accordance with the signal ADVANCE. When the clock counter 21 is advanced to its state BD by the negative transition of the signal CLK ABCD 2μs, the signal CLK CTR BD enables the J input to the flip-flop BLANK for setting it, whereby its one output inhibits each one of the output gates, such as the gate 14. It should be understood that the flip-flop BLANK is set during the middle portion of the time interval when the state BD of the clock counter 21 is enabled since the flip-flop BLANK is triggered by the clock signal —CLK during a negative transition thereof which occurs at approximately one microsecond following the initial setting of the BD stage of the clock counter 21. At the end of the interval of time at which the stage BD is set, a negative transition of the signal CLK ABCD 2μs occurs and causes the gate 25 to be enabled for the purpose of supplying a clock signal for the counter 12, whereby the clock signal and the signal condition of the buffer circuit 21 cause the state of the counter 12 to be advanced accordingly. The counter 12 of the preferred embodiment of the present invention is composed of J-K flip-flops which when interconnected in the form of a binary counter can change states within one microsecond of time. Therefore, the counter 12 is advanced to its next state and each one of its stages settles down before the middle of the interval BA of the clock counter 21.

When the next negative transition of the signal —CLK occurs, the clock-counter 21 is in its state BA because the last negative transition of the signal CLK ABCD 2μs occurred to advance the clock counter 21 to its last stage BD. Thus, the signal —CLK energizes the flip-flop BLANK since its one output primes its K input. As a result, the inhibiting signal from the flip-flop BLANK is removed from the output gates such as the gate 14. The 1 output of the flip-flop BLANK had energized the reset input to the latch START BLANK, whereby it was reset and thus another cycle of operation may occur when the next advance signal for the counter 12 occurs.

It should be understood that the buffer circuit 17 enables the advance signal to be stored temporarily before blanking or inhibiting the decoding gates to permit the outputs of the decoding gates, together with other signals, if desired, to cause the advance signal to be generated, whereby the signal ADVANCE need not be present at the time of blanking the decoding gates and advancing the counter 12. Also, the buffer circuit 17 enables the storage of the advance signal so that in the case where the signal ADVANCE is only present momentarily or is not present for a sufficiently long period of time, the advance signal need only be present for a length of time sufficient to be stored in the circuit 17. It should also be understood that while the counter 12 has been described as being a binary counter for explanation purposes, any type or kind of sequencing circuit may be employed, and in an actual circuit which was constructed and successfully tested, a binary-coded hexadecimal counter was employed. Also, while a single signal ADVANCE was shown and described, any combination of a plurality of signals may be employed to change the state of the counter and in any desired sequence.

What is claimed is:

1. A sequencing arrangement comprising:

sequencing means for generating a series of sequentially-occurring groups of counting signals in response to counter advancing signals;

a plurality of output logic gates responsive to said groups of signals for generating sequencing information;

blanking means for inhibiting each one of said plurality of logic gates; and control means responsive to said advancing signals for energizing said blanking means and for permitting said sequencing means to generate said counting signals after a first predetermined time interval following said energization of said blanking means, said control means de-energizing said blanking means after a second predetermined time interval following said first time interval to permit said gates to respond to said groups of signals, wherein said control means includes a blank bi-stable device for inhibiting said logic gates, a start blank bi-stable device enabling said blank bi-stable device in response to said advancing signals.

2. A sequencing arrangement according to claim 1, wherein said control means further includes a clock counter for causing said start blank bi-stable device to be enabled in response to a first timing signal, a coincidence gate responsive to said timing signal and to said advancing signals for enabling said start bi-stable device.

3. A sequencing arrangement according to claim 2, wherein said clock counter further generates a second timing signal to enable said bi-stable device when said start blank bi-stable device is energized.

4. A sequencing arrangement according to claim 3, wherein said control means still further includes a clock source for generating a first clock signal for energizing said blank bi-stable device at the beginning of said first time interval when said blank bi-stable device is energized and when said clock counter generates said second timing signal, said first clock signal de-energizing said blank bi-stable device at the end of said second time interval.

5. A sequencing arrangement according to claim 4, wherein said clock source further generates a second clock signal for advancing said clock counter in a cyclically sequential manner and for causing said sequencing means to be advanced at the end of said first time interval and at the beginning of said second time interval.

6. A sequencing arrangement according to claim 5, wherein said sequencing means includes a binary counter, said output gates converting the binary-coded counting signals to decimal-coded sequencing information.

7. A sequencing arrangement according to claim 6, wherein said blank bi-stable device comprises a J-K flip-flop, said start bi-stable device comprising a latch circuit.

8. A sequencing arrangement comprising:

sequencing means including counter means for generating a series of sequentially-occurring groups of counting signals in response to counter advancing information;

a plurality of output logic gates responsive to said groups of signals for generating sequencing information;

blanking means for inhibiting each one of said plurality of logic gates;

said sequencing means further including buffer storage means for storing said counter advancing information;

priming means for preparing said blanking means to be enabled in response to said counter advancing information;

gating means responsive to said blanking means being prepared for causing said counter advancing information to be stored in said storage means; and control means for energizing said blanking means to enable said output logic gates and for causing the stored counter advancing information to be transferred to said counter means, said control means causing said blanking means to be de-energized after a predetermined timing interval.

9. A sequencing arrangement according to claim 8, wherein said buffer storage means includes a second counter, said advancing information comprising a single ADVANCE signal.

* * * * *